United States Patent [19]
Kato

[11] Patent Number: 5,392,084
[45] Date of Patent: Feb. 21, 1995

[54] VARIABLE MAGNIFICATION FINDER OPTICAL SYSTEM

[75] Inventor: Shigeru Kato, Tachikawa, Japan

[73] Assignee: Olympus Optical Co., Ltd., Tokyo, Japan

[21] Appl. No.: 88,338

[22] Filed: Jul. 9, 1993

[51] Int. Cl.$^6$ ............ G03B 13/10; G03B 17/02; G03B 5/00
[52] U.S. Cl. .................. 354/222; 354/159; 354/195.12
[58] Field of Search ............ 354/222, 159, 94, 195.12

[56] References Cited

U.S. PATENT DOCUMENTS

| | | | |
|---|---|---|---|
| 4,652,104 | 3/1987 | Harvey | 354/222 X |
| 4,973,997 | 11/1990 | Harvey | 354/222 X |
| 5,012,262 | 4/1991 | Mogamiya et al. | 354/149.1 |
| 5,021,815 | 6/1991 | Harvey | 354/222 |
| 5,144,349 | 9/1992 | Kato et al. | 354/222 |
| 5,231,534 | 7/1993 | Kato | 354/222 X |

OTHER PUBLICATIONS

Photographic Industries, Nov. 1991, pp. 36 & 37, vol. 49, No. 11, Shashin Kogyo Publishing Co., Ltd.

Primary Examiner—Howard B. Blankenship
Assistant Examiner—Jae N. Noh
Attorney, Agent, or Firm—Cushman, Darby & Cushman

[57] ABSTRACT

A variable magnification finder optical system is constructed independent of a photographic optical system, and includes an objective optical system of positive refracting power, a field frame, and an eyepiece optical system of positive refracting power. The objective optical system has a variable magnification lens unit for changing the field angle of the variable magnification finder optical system in accordance with a change of the field angle of the photographic optical system and a fixed lens unit, which can be replaced with another fixed lens unit for changing over the finder magnification. Thus, this finder optical system allows the photography of an object with a field image, easy for observation, coordinated with that of the photographic optical system.

7 Claims, 13 Drawing Sheets

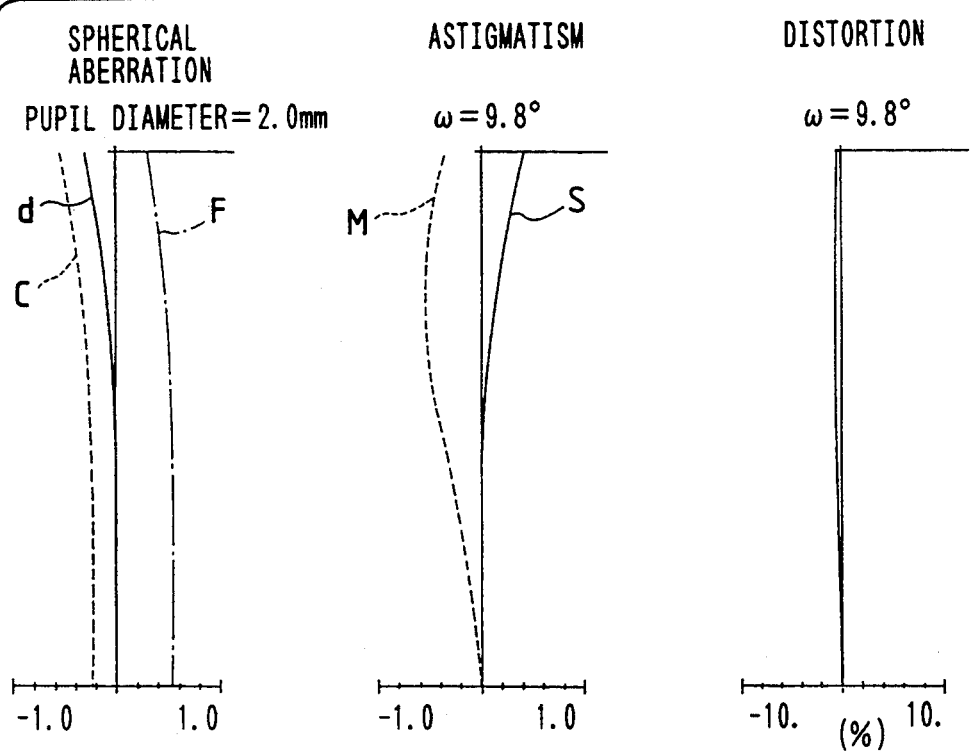
FIG. 11 TELEPHOTO
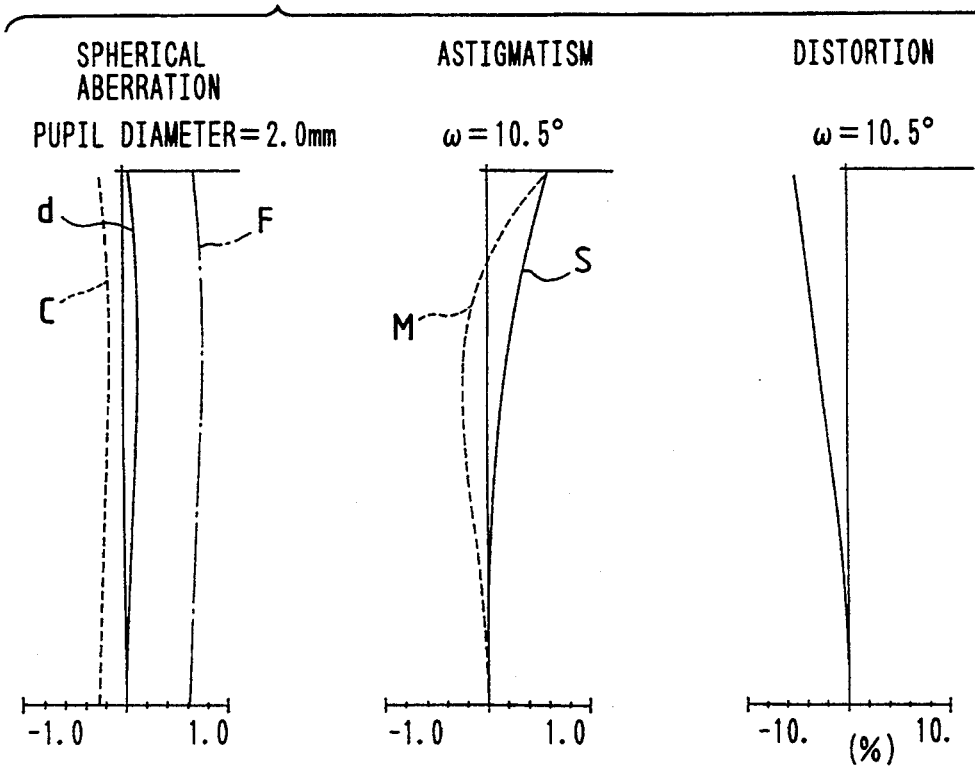
FIG. 12 WIDE ANGLE

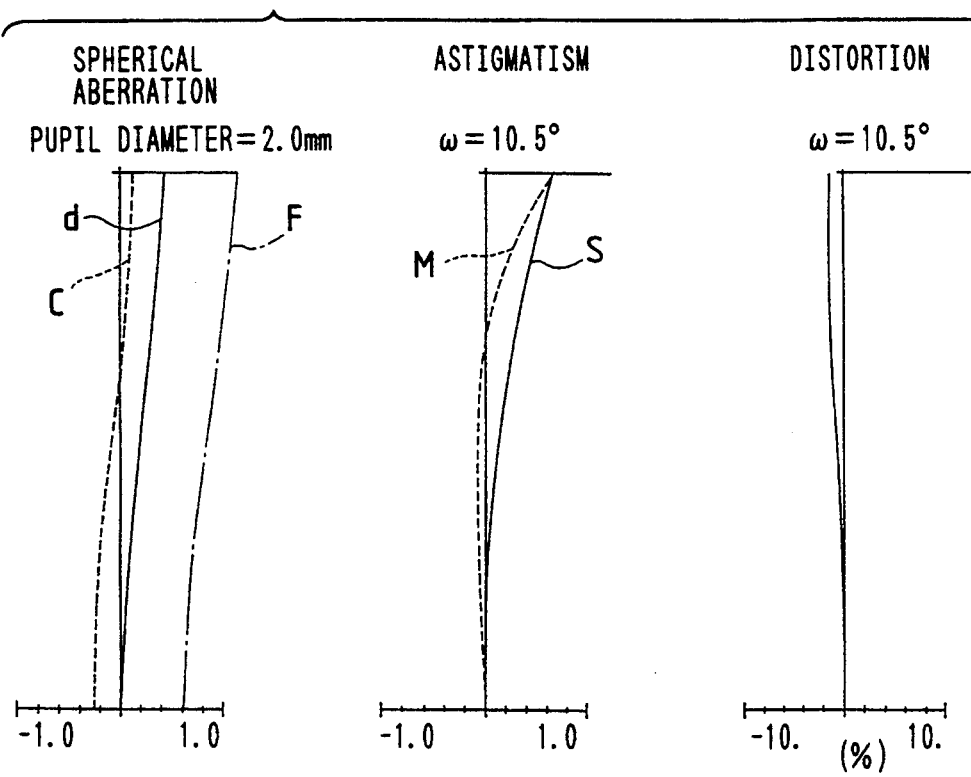
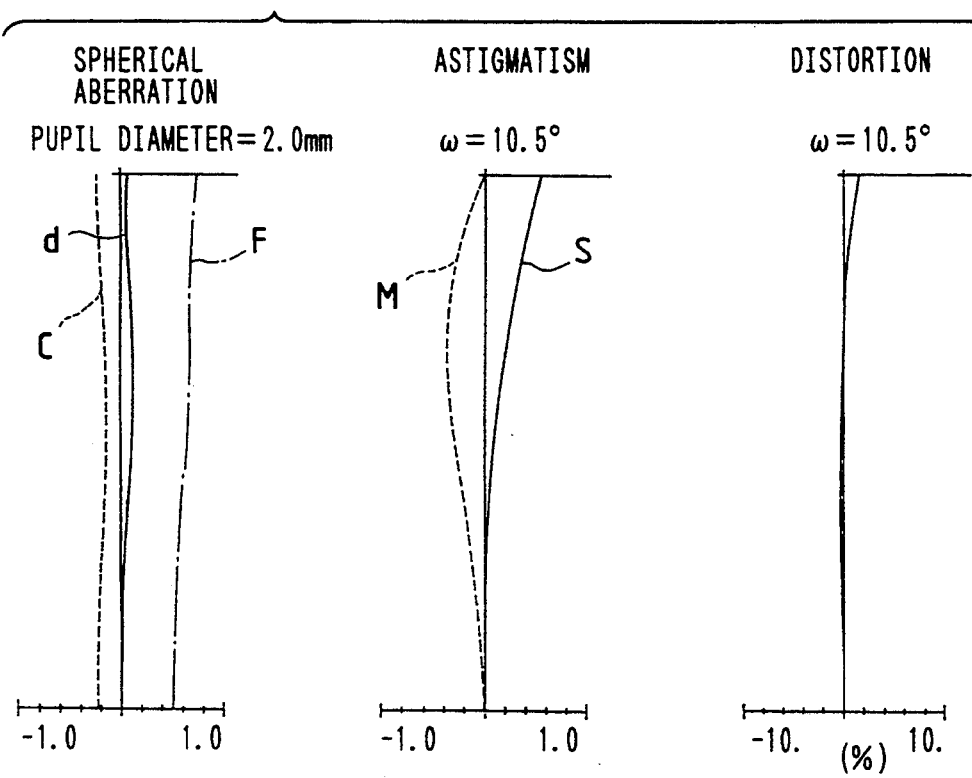

VARIABLE MAGNIFICATION FINDER OPTICAL SYSTEM

BACKGROUND OF THE INVENTION

1. Field of the Invention

This invention relates to a variable magnification finder optical system which can change a photographic range by converting the dimensions of film onto which an image is photographed into other dimensions and, in particular, to a variable magnification finder optical system which in a camera permitting panoramic photography, changes a finder in association with the conversion of the film size.

2. Description of the Related Art

In recent years, cameras for 35 mm film format have been designed so that a light-blocking plate shielding the upper and lower portions of a film surface is placed in the optical path adjacent to the film surface to laterally enlarge an range in which the image is photographed on a film. In this way, panoramic photography that enhances a wide-screen sensitivity of a photographic picture has been popularized. In most of the finders for cameras provided with such a function, as shown in FIG. 1, a frame (panoramic frame) B indicative of the range in which the image is photographed on the film in the panoramic photography is marked within a field frame A for ordinary photography indicative of the photographic range. Consequently, the problem has been encountered that for a photographer, it is hard to imagine the result of the picture. This is because in ordinary photography, the panoramic frame B overlaps the field frame A and the image to be photographed is difficult to view, while in panoramic photography, other images out of the photographic range will also be visible.

In order to obviate such drawbacks, provision has been made that in the panoramic photograph, the vertical length of the field frame A for ordinary photography is changed and diminished to correspond to that of the panoramic frame B. This, however, has caused the problem that the area occupied by the visual field within the finder becomes smaller and thus the photographer has the impression that the visual field has narrowed.

SUMMARY OF THE INVENTION

It is, therefore, an object of the present invention to provide a variable magnification finder optical system in which, when the camera is switched from an ordinary photographic mode to a panoramic mode, the field frame of the finder is changed over to accurately indicate the photographic range within the finder and the finder magnification is increased with the resultant easy observation.

In order to achieve this object, the variable magnification finder-optical system according to the present invention comprises at least an objective optical system having a positive refracting power and an eyepiece optical system having a positive refracting power. The objective optical system includes at least one variable magnification lens unit for changing the field angle of the variable magnification finder optical system, in other words for zooming, in association with the change of the field angle of the photographic optical system and at least one fixed lens unit, which can be replaced by another fixed lens unit a switch in finder magnification other than zoom mentioned above.

Further, the variable magnification finder optical system according to the present invention is designed so that the replacement of the fixed lens unit takes place in accordance with the change of the size of the image plane of the photographic optical system and at the same time, the field frame is also replaced with another field frame of different size. The variable magnification lens unit is disposed on the object side of the fixed lens unit.

Referring now to FIG. 2 through FIGS. 4A and 4B, the function of the present invention is explained. FIG. 2 is a conceptional view of the variable magnification finder optical system of the present invention. In this diagram, reference numeral 1 represents an objective optical system composed of a first variable magnification lens unit $G_1$, a second variable magnification lens unit $G_2$, a fixed lens unit $G_{3N}$ held stationary during the variation of magnification, and a prism 1p; 2 an intermediate image formed as an inverted image by the objective optical system 1; 3 a field frame placed adjacent to the intermediate image 2; 4 an eyepiece optical system composed of a prism 4p and an eyepiece R, for erecting the intermediate image 2; and 5 an eyepiece section which corresponds to an eyepoint where the observation of an erected image is made. The variable magnification finder optical system, constructed independent of the photographic optical system, is designed so that when the magnification of the photographic optical system varies, the variable magnification lens units $G_1$ and $G_2$ included in the objective lens system, which is disposed on the object side of the variable magnification finder optical system move along the optical axis, and the correlation of field angles of the photographic optical system and the variable magnification finder optical system is kept constant. The fixed lens unit $G_{3N}$, although its position remains unchanged during the variation of magnification, is removed from the optical path in the panoramic photography and instead, a fixed lens unit $G_{3P}$ for panoramic photography held stationary during the variation of magnification is inserted therein. Here, when the focal lengths of the fixed lens units $G_{3N}$ and $G_{3P}$ are denoted by $f_{3N}$ and $f_{3P}$, respectively, these lens units are chosen to meet the condition given by $$f_{3N} > f_{3P} \tag{1}$$

FIG. 3 is a view showing the variation of the focal length of the entire objective optical system 1 where the fixed lens units $G_{3N}$ and $G_{3P}$ are inserted respectively in the optical path of the variable magnification finder optical system thus available. As will be evident from FIG. 3, in panoramic photography, the insertion of the fixed lens unit $G_{3P}$ renders a focal length $f_{TP}$ of the objective optical system 1 greater than a focal length $f_{TN}$ in the ordinary photography. This increases the finder magnification depending on the focal length ratio between the objective optical system 1 and the eyepiece optical system 4. If the fixed lens units $G_{3N}$ and $G_{3P}$ merely satisfy the condition given by Eq. (1), the shift of the imaging position (diopter shift) of the intermediate image 2 will be caused by the changeover of the lens units. This shift should be corrected, or the intermediate image 2 should be formed at a constant position, by adjusting the positions of the variable magnification lens units $G_1$ and $G_2$. To do away with such a correction by the positional adjustment of the variable magnification lens unit G₁ and G₂, the positional relationship between an object point $O_{G3}$ and an image point $I_{G3}$ of the fixed lens unit $G_{3P}$ is made identical with that of the fixed lens unit $G_{3N}$. In this way, the positional setting of the fixed lens unit is made so that the imaging position of the intermediate image 2 in the panoramic photography is equal to that in the ordinary photography (the same diopter) correction by the positional adjustment of the variable magnification lens units G₁ and G₂. Consequently, the states of the variable magnification lens units G₁ and G₂ moving along the optical axis in response to the state of the photographic optical system can be made common to ordinary and panoramic photographics.

In addition to the condition given by Eq. (1), it is desirable that the fixed lens units $G_{3N}$ and $G_{3P}$ further satisfy the condition given by $$|(f_{3N}+f_{3P})/(f_{3N}-f_{3P})| < 6.0 \quad (2)$$

The excess of the upper limit in Eq. (2) will enhance the refracting powers of tile fixed lens units $G_{3N}$ and $G_{3P}$, and will increase aberration, with the result that good optical properties cannot be obtained.

FIGS. 4A and 4B are views for explaining the relationship between the field angle in a horizontal direction and the variable magnification finder optical system in the ordinary and panoramic photographies, respectively. In these figures, reference symbols ω and ω' designate field angles; $h_N$ and $h_P$, lengths of the field frames 3 and 3' in the horizontal direction; and $θ_N$ and $θ_P$, angles of emergence. The photographic range, namely, the field angle, in the panoramic photography becomes narrower (smaller) in the vertical direction than that in the ordinary photography, but remains unchanged in the horizontal direction, Hence, in order to make the field angle smaller in the vertical direction, a field frame 3' for panoramic photography made smaller in vertical length, instead of the field frame 3, is placed in accordance with the replacement by the fixed lens unit $G_{3P}$. As mentioned above, in the panoramic photography, the focal length of the objective optical system 1 becomes greater. If, therefore, the horizontal length of the field frame 3' were to be the same (length $h_N$) as that of the field frame 3 in the ordinary photography, the field angle in the horizontal direction which is ω in ordinary photography would be reduced to ω' in the panoramic photography. This causes inconvenience to coordination with the field angle of the photographic optical system. If the length $h_N$ of the field frame 3' in the horizontal direction is increased to a length $h_p$, the field angle ω will return to the field angle ω' and the angle of emergence $θ_N$ will be enlarged to the angle $θ_P$, resulting in a larger field image. In this way, the field frame 3' for panoramic photography is used which is smaller in vertical length and larger in horizontal length than the field frame 3 for ordinary photography.

The finder optical system according to the present invention, as shown, for example, in FIG. 5, is designed independent of a photographic optical system. Specifically, as shown in FIG. 6, a photographic optical path Lb is provided independent of a finder optical path Le. In other words, a photographic optical system α is disposed separate from the finder optical system (including the objective system 1, the prisms 1p and 4p, the eyepiece R, etc.) In photography, an observer views, through the finder, an image photographed on a film provided in the photographic optical path Lb. At this time, if the magnification of the photographic optical system varies, that of the finder optical system will also vary accordingly, even though both systems are disposed separate from each other. This is as stated in the beginning of this specification.

This and other objects as well as the features and advantages of the present invention will become apparent from the following detailed description of the preferred embodiments when taken in conjunction with the accompanying drawings.

BRIEF DESCRIPTION OF THE DRAWINGS

FIGS. 9 to 11 are aberration curve diagrams relative to wide angle, middle, and telephoto positions in ordinary photography of the first embodiment;

FIGS. 12 to 14 are aberration curve diagrams relative to wide angle, middle, and telephoto positions in panoramic photography of the first embodiment;

DETAILED DESCRIPTION OF THE PREFERRED EMBODIMENTS

Figure 1:
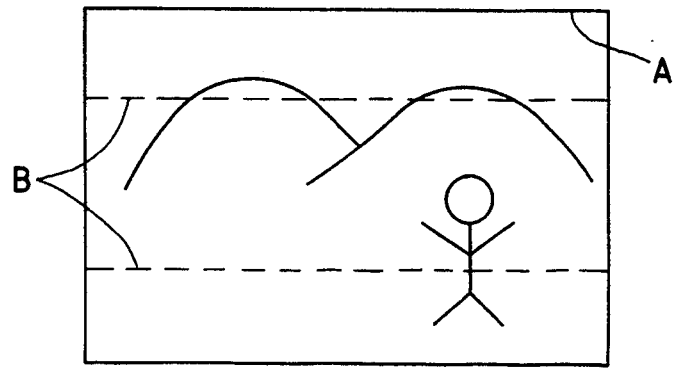
FIG. 1 is a view showing the state of the visual field of a camera finder in the prior art.
Figure 2:
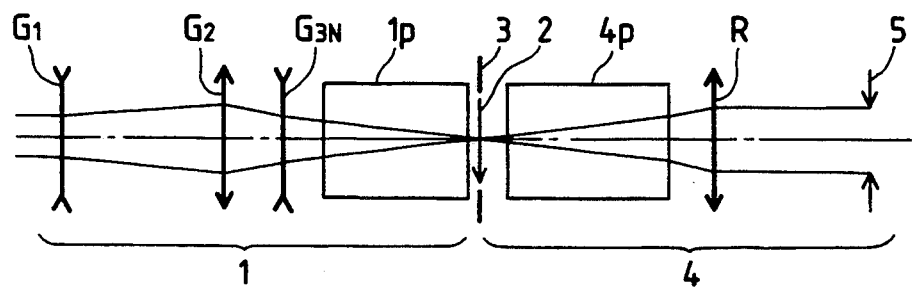
FIGS. 2, 3, and 4A and 4B are explanatory views of fundamental functions of a variable magnification finder optical system according to the present invention.
Figure 3:
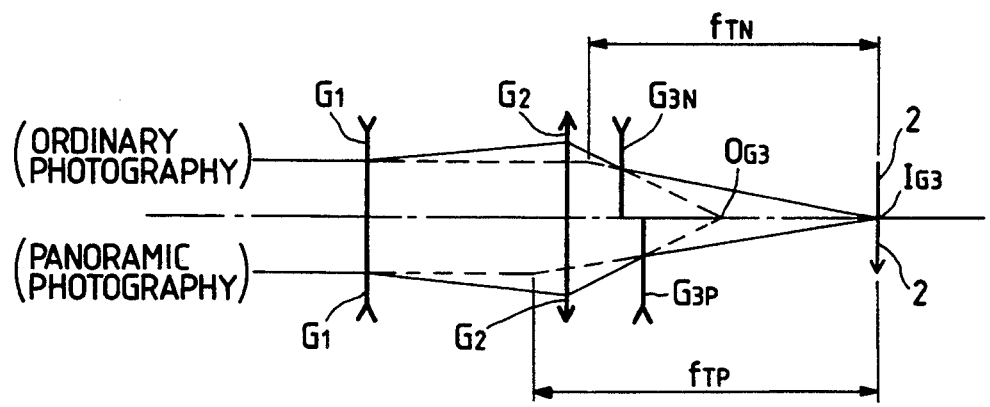
Figure 4A:
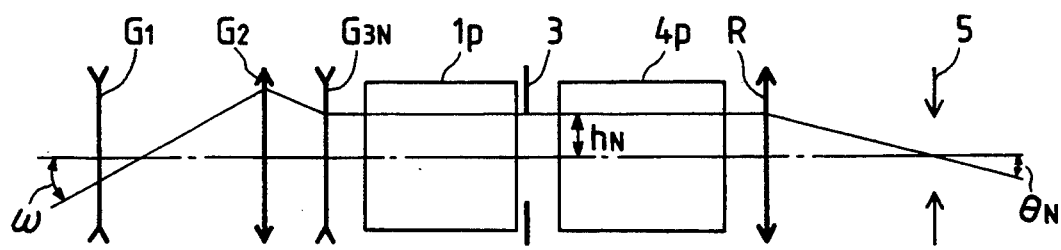
Figure 4B:
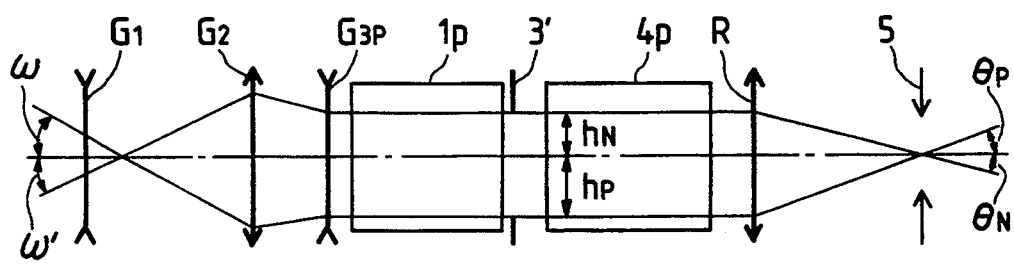
Figure 5:
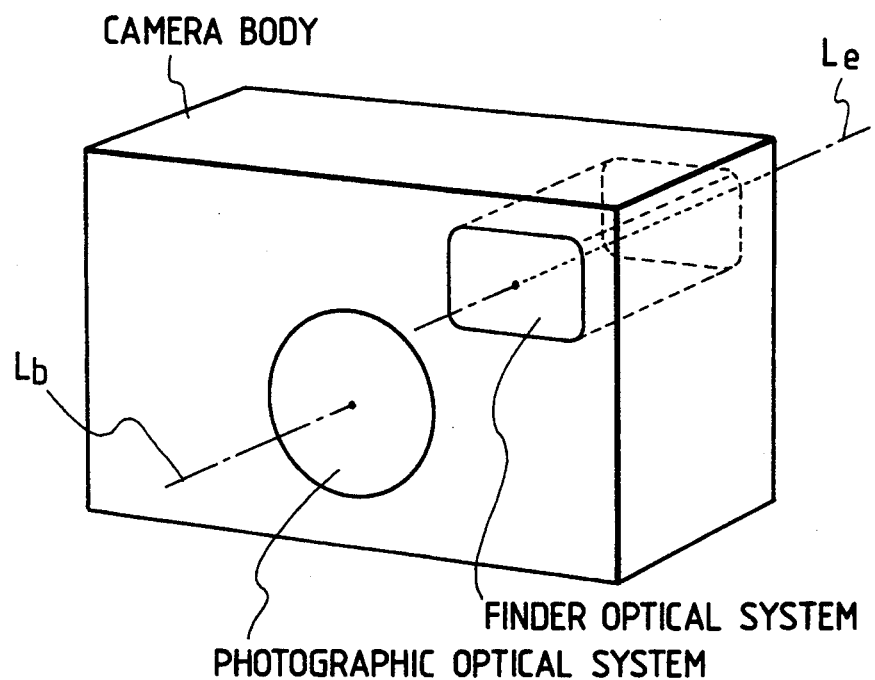
FIG. 5 is an explanatory view showing that the finder optical system of the present invention is independent of a photographic optical system.
Figure 6:
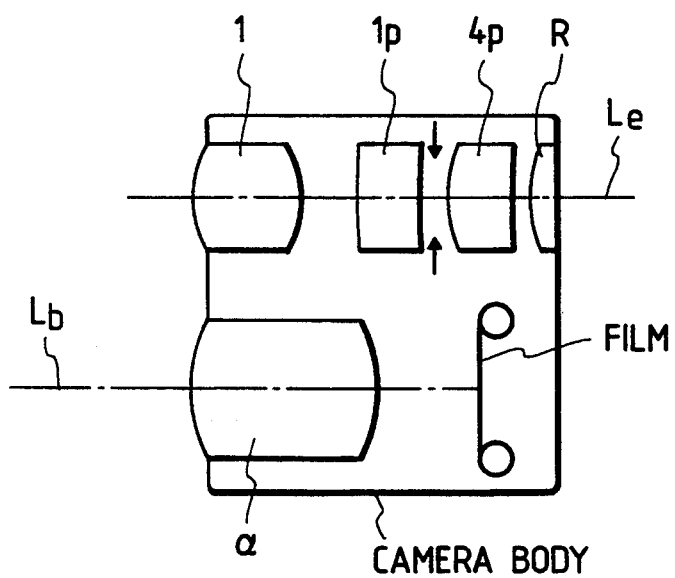
FIG. 6 Is a sectional view thereof.
Figure 7:
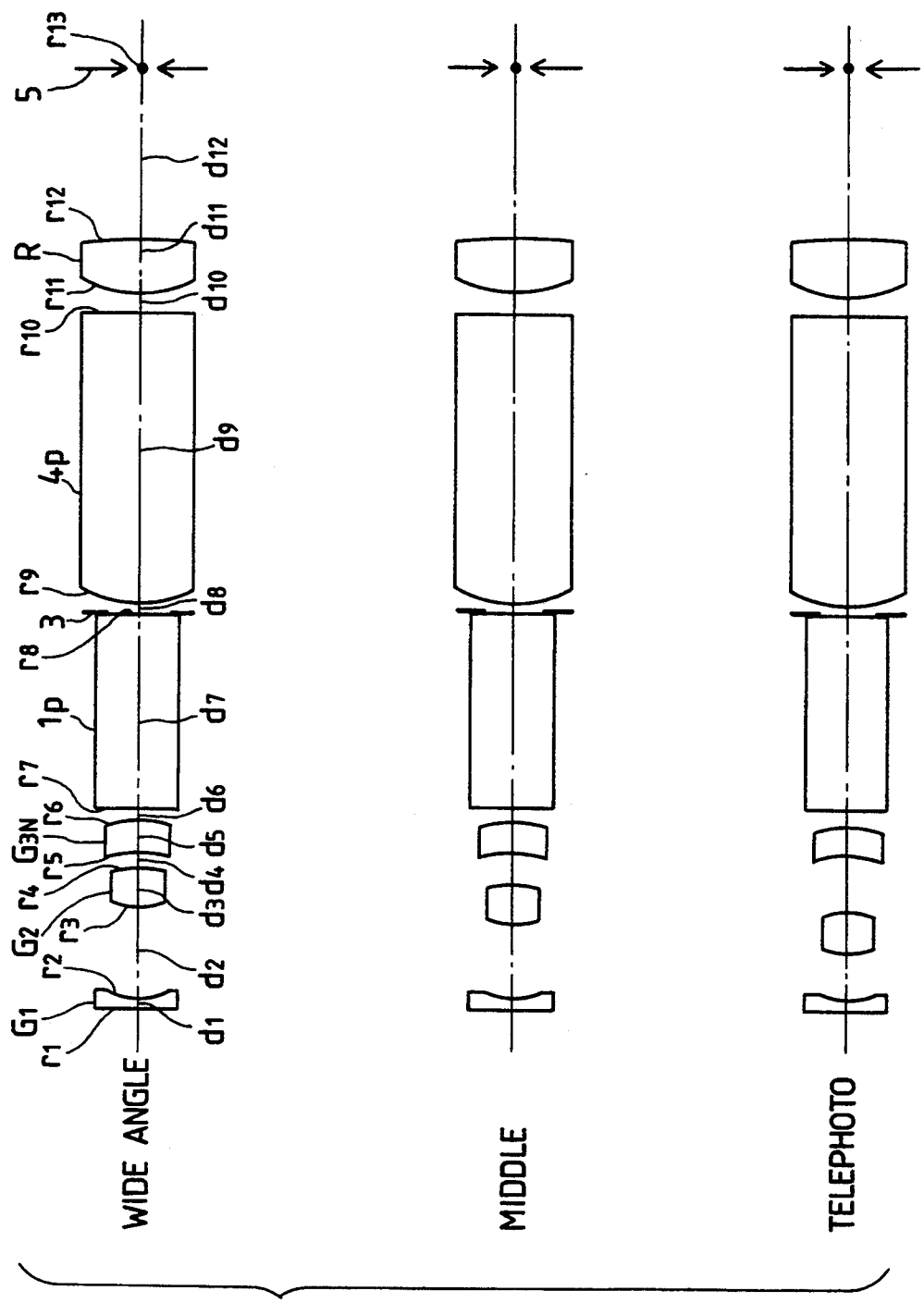
FIGS. 7 and 8 are developed views showing arrangements relative to wide angle, middle, and telephoto positions in ordinary and panoramic photographies, respectively, of a first embodiment of the variable magnification finder optical system according to the present invention.
Figure 8:
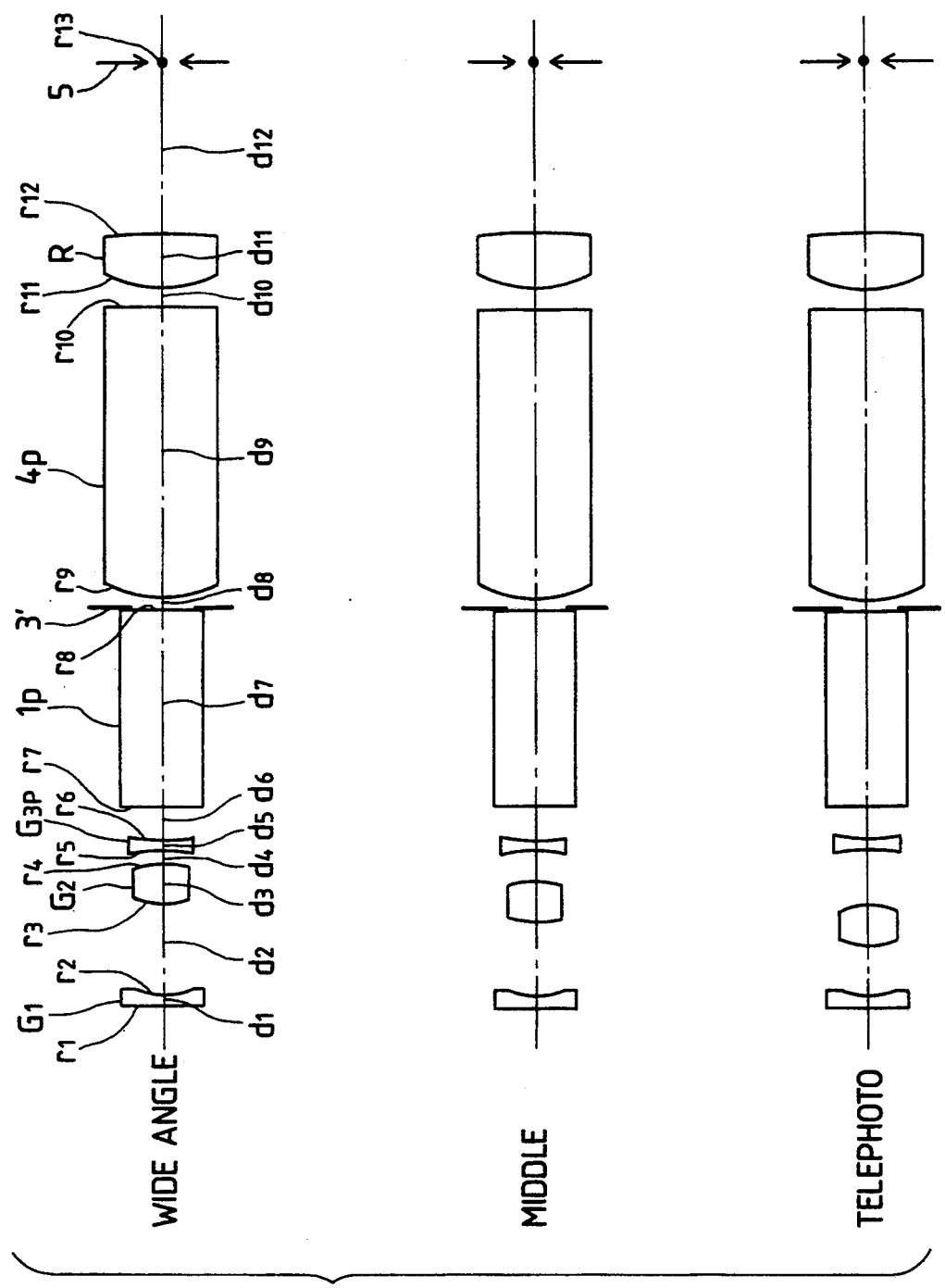
Figure 9:
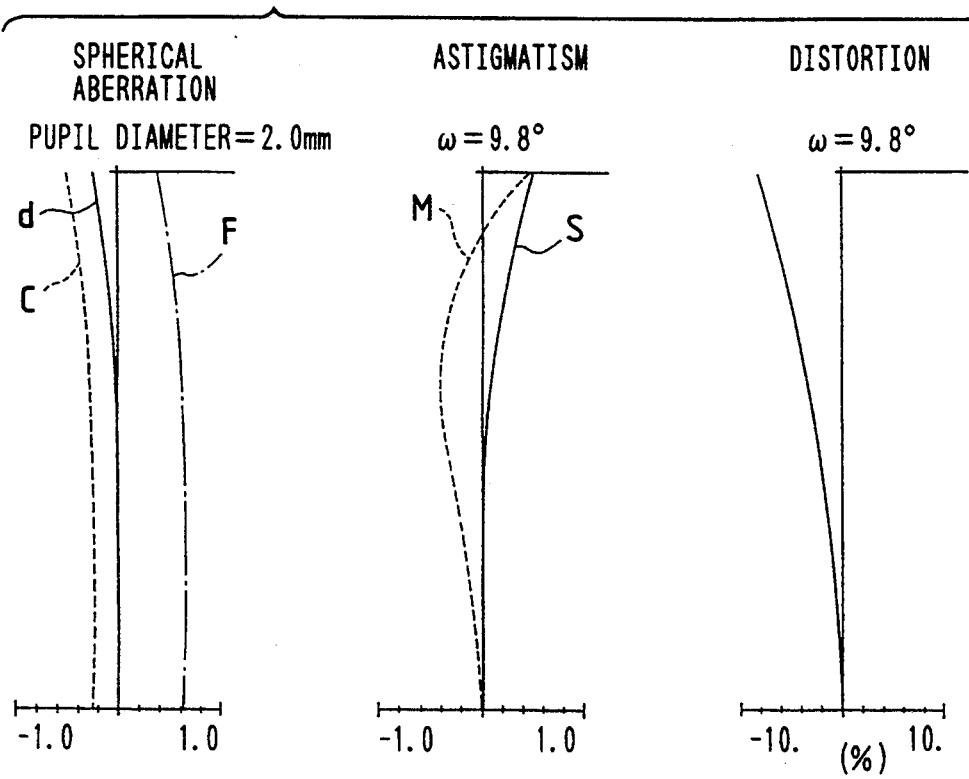
Figure 10:
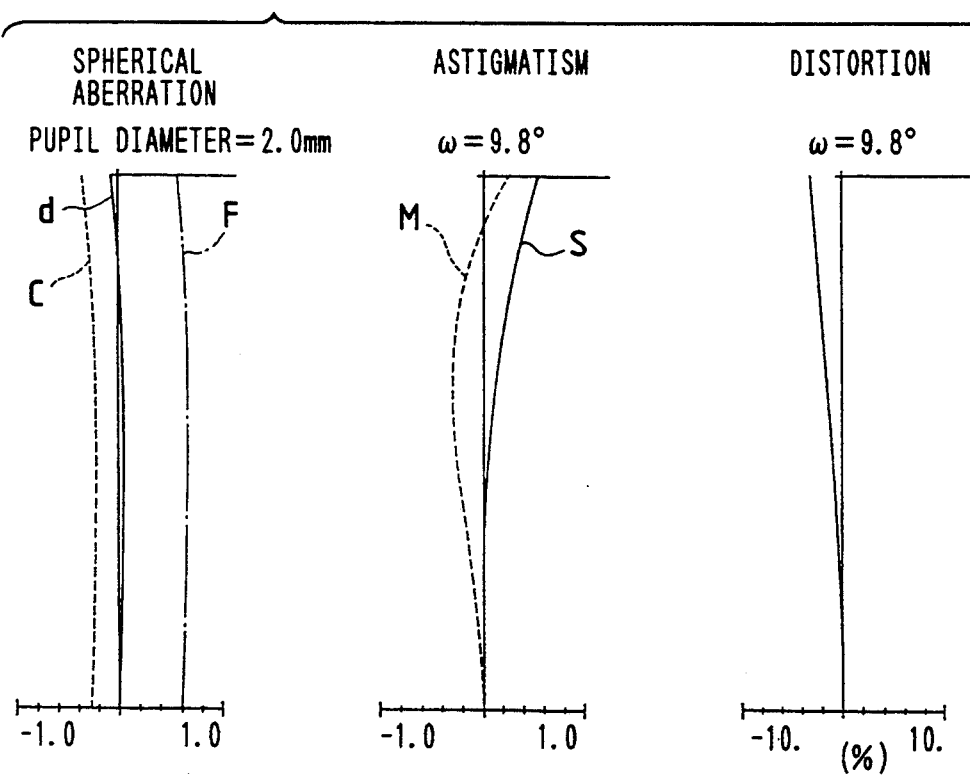

Referring to the embodiments shown in the drawings, the present invention will be explained in detail below.
First embodiment FIGS. 7 and 8 show the first embodiment of the present invention. In FIG. 7, an image of an object, not shown, in ordinary photography is formed, through the objective optical system 1 comprising the first and second variable magnification lens units G₁ and G₂ moving along the optical axis in association with the variation of magnification of the photographic optical system, the fixed lens unit $G_{3N}$, and the prism 1p with two reflecting surfaces, adjacent to the exit surface of the prism 1p. Further, the image is erected, through the field frame 3, by the reflecting surface of the prism 4p of the eyepiece 4 and is observed through the eyepiece R from the eyepiece section 5. In panoramic photography, on the other hand, the fixed lens unit $G_{3N}$, as shown in FIG. 8, is replaced with the fixed lens unit $G_{3P}$ which is higher in negative refracting power. Consequently, the focal length of the objective optical system 1 becomes greater, and the finder magnification increases. At the same time, instead of the field frame 3, the field frame 3' is placed in the optical path which is small in vertical length and large in horizontal length compared with the size of the field frame 3 for field observation. This placement brings about the coordination between the visual field of the finder in the variable magnification finder optical system and the range of panoramic photography in the photographic optical system.

The first embodiment is designed so that the fixed lens units $G_{3N}$ and $G_{3P}$ are each structured with a single negative lens and the fixed lens unit $G_{3N}$ is larger in thickness than the fixed lens unit $G_{3P}$, thereby producing the path difference to correct the shift of the imaging position (diopter shift) caused by the change of the focal length.

The numerical data in the developed views of optical paths given In FIGS. 7 and 8 are shown below. Aspherical coefficients E, F, and G in the data are found from the calculation for aspherical configuration expressed by $$x = (y^2/r)/[1 + \sqrt{1 - (y/r)^2}\,] + Ey^4 + Fy^6 + Gy^8 \quad (3)$$

where x is the coordinates in the direction of the optical axis, y is the coordinates in the direction normal to the optical axis, and r is the paraxial radius of curvature.

The aberration curve diagrams are shown in FIGS. 9 to 14.

| (Ordinary photography) | |
|---|---|
| Magnification | 0.38 ~ 0.50 ~ 0.66 |
| Field angle of incidence (2ω) | 53.6 ~ 40.0 ~ 30.0 |
| Field angle of emergence (2ω) | 19.6 ~ 19.6 ~ 19.6 |

$r_1 = 175.480$
  $d_1 = 1.0$   $n_1 = 1.584$   $\nu_1 = 30.5$
$r_2 = 6.263$ (aspherical)
  $d_2 = D_1$ (variable)
$r_3 = 7.884$ (aspherical)
  $d_3 = 4.0$   $n_2 = 1.492$   $\nu_2 = 57.7$
$r_4 = -8.040$
  $d_4 = D_2$ (variable)
$r_5 = -8.276$ (aspherical)
  $d_5 = 3.23$   $n_3 = 1.584$   $\nu_3 = 30.5$
$r_6 = -9.836$
  $d_6 = D_3$ (variable)
$r_7 = \infty$
  $d_7 = 18.49$   $n_4 = 1.492$   $\nu_4 = 57.7$
$r_8 = \infty$
  $d_8 = 1.0$ (field frame position)
$r_9 = 11.382$
  $d_9 = 28.0$   $n_5 = 1.492$   $\nu_5 = 57.7$
$r_{10} = \infty$
  $d_{10} = 2.0$
$r_{11} = 11.293$ (aspherical)
  $d_{11} = 5.0$   $n_6 = 1.492$   $\nu_6 = 57.7$
$r_{12} = -280.152$
  $d_{12} = 16.5$
$r_{13} = $ (eyepoint)

| Aspherical coefficients | |
|---|---|
| Second surface ($r_2$) | |
| $E = 0.16310 \times 10^{-3}$, | $F = -0.98365 \times 10^{-6}$, |
| $G = -0.71651 \times 10^{-6}$ | |
| Third surface ($r_3$) | |
| $E = -0.55391 \times 10^{-3}$, | $F = -0.13486 \times 10^{-4}$, |
| $G = 0.61094 \times 10^{-6}$ | |
| Fifth surface ($r_5$) | |
| $E = -0.32507 \times 10^{-3}$, | $F = -0.72002 \times 10^{-4}$, |
| $G = 0.75312 \times 10^{-5}$ | |
| Eleventh surface ($r_{11}$) | |
| $E = -0.14831 \times 10^{-3}$, | $F = 0.13250 \times 10^{-5}$, |
| $G = -0.30041 \times 10^{-7}$ | |

| Zoom data | | | |
|---|---|---|---|
| | Wide angle position | Middle position | Telephoto position |
| $D_1$ | 10.763 | 7.280 | 4.605 |
| $D_2$ | 1.000 | 2.702 | 4.977 |
| $D_3$ | 1.000 | 1.000 | 1.000 |

| (Panoramic photography) | |
|---|---|
| Magnification | 0.46 ~ 0.60 ~ 0.79 |
| Field angle of incidence (2ω) | 42.0 ~ 38.4 ~ 37.6 |
| Field angle of emergence (2ω) | 21.0 ~ 21.0 ~ 21.0 |

$r_1 = 175.480$
  $d_1 = 1.0$   $n_1 = 1.584$   $\nu_1 = 30.5$
$r_2 = 6.263$ (aspherical)
  $d_2 = D_1$ (variable)
$r_3 = 7.884$ (aspherical)
  $d_3 = 4.0$   $n_2 = 1.492$   $\nu_2 = 57.7$
$r_4 = -8.040$
  $d_4 = D_2$ (variable)
$r_5 = -224.484$ (aspherical)
  $d_5 = 3.23$   $n_3 = 1.584$   $\nu_3 = 30.5$
$r_6 = 24.298$
  $d_6 = D_3$ (variable)
$r_7 = \infty$
  $d_7 = 18.49$   $n_4 = 1.492$   $\nu_4 = 57.7$
$r_8 = \infty$
  $d_8 = 1.0$ (field frame position)
$r_9 = 11.382$
  $d_9 = 28.0$   $n_5 = 1.492$   $\nu_5 = 57.7$
$r_{10} = \infty$
  $d_{10} = 2.0$
$r_{11} = 11.293$ (aspherical)
  $d_{11} = 5.0$   $n_6 = 1.492$   $\nu_6 = 57.7$
$r_{12} = -280.152$
  $d_{12} = 16.5$
$r_{13} = $ (eyepoint)

| Aspherical coefficients | |
|---|---|
| Second surface ($r_2$) | |
| $E = 0.16310 \times 10^{-3}$, | $F = -0.98365 \times 10^{-6}$, |
| $G = -0.71651 \times 10^{-6}$ | |
| Third surface ($r_3$) | |
| $E = -0.55391 \times 10^{-3}$, | $F = -0.13486 \times 10^{-4}$, |
| $G = 0.61094 \times 10^{-6}$ | |
| Fifth surface ($r_5$) | |
| $E = -0.58050 \times 10^3$, | $F = -0.95640 \times 10^{-5}$, |
| $G = -0.30041 \times 10^{-7}$ | |
| Eleventh surface ($r_{11}$) | |
| $E = -0.14831 \times 10^{-3}$, | $F = 0.13250 \times 10^{-5}$, |
| $G = -0.30041 \times 10^{-7}$ | |

| Zoom data | | | |
|---|---|---|---|
| | Wide angle position | Middle position | Telephoto position |
| $D_1$ | 10.763 | 7.280 | 4.605 |
| $D_2$ | 1.170 | 2.872 | 5.146 |
| $D_3$ | 3.058 | 3.058 | 3.058 |

The value of Eq. (2) is 1.22.

Second embodiment

Figure 15:
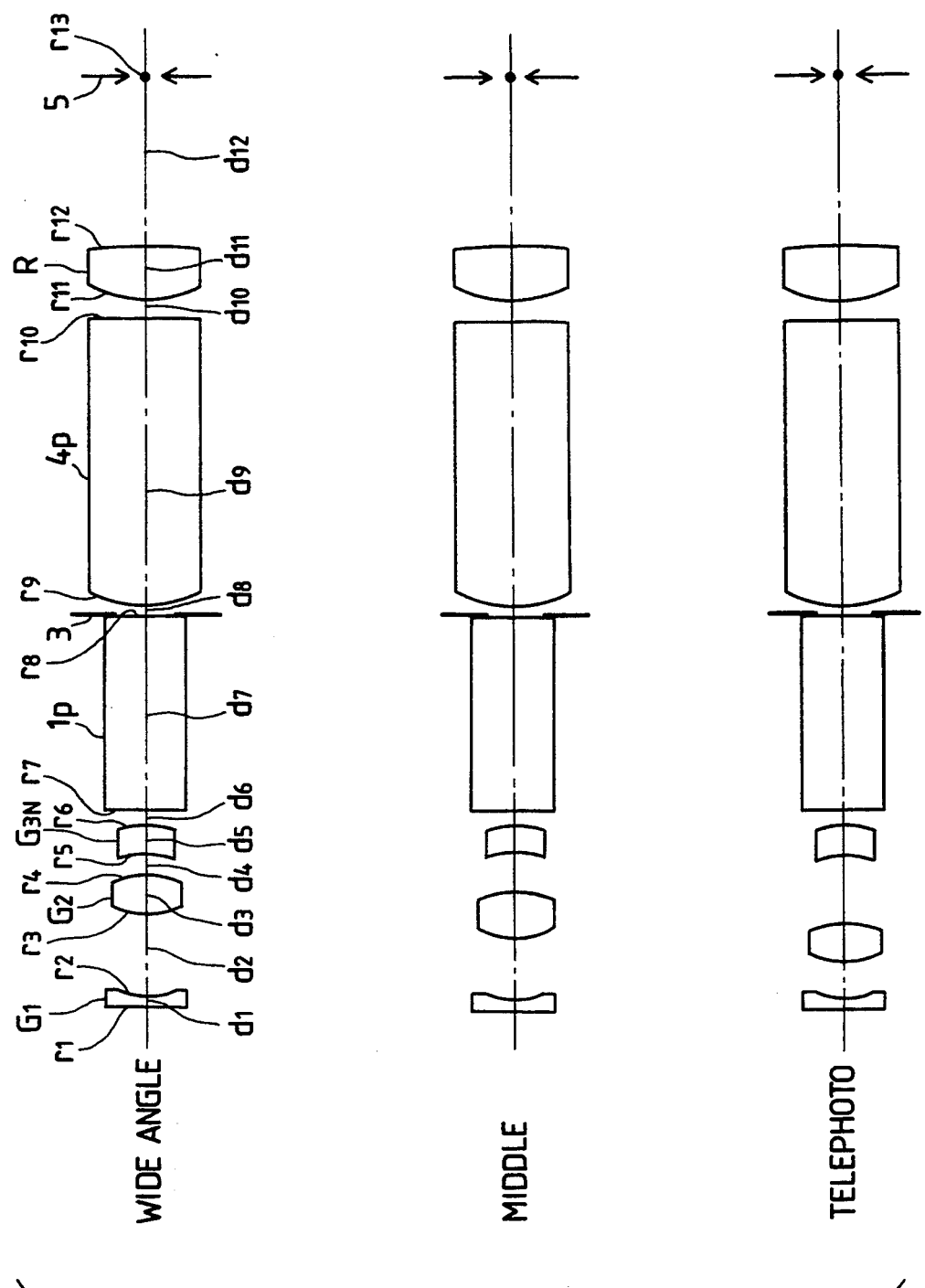
FIGS. 15 and 16 are developed views showing arrangements relative to wide angle, middle, and telephoto positions in ordinary and panoramic photographies, respectively, of a second embodiment of the variable magnification finder optical system according to the present invention.
Figure 16:
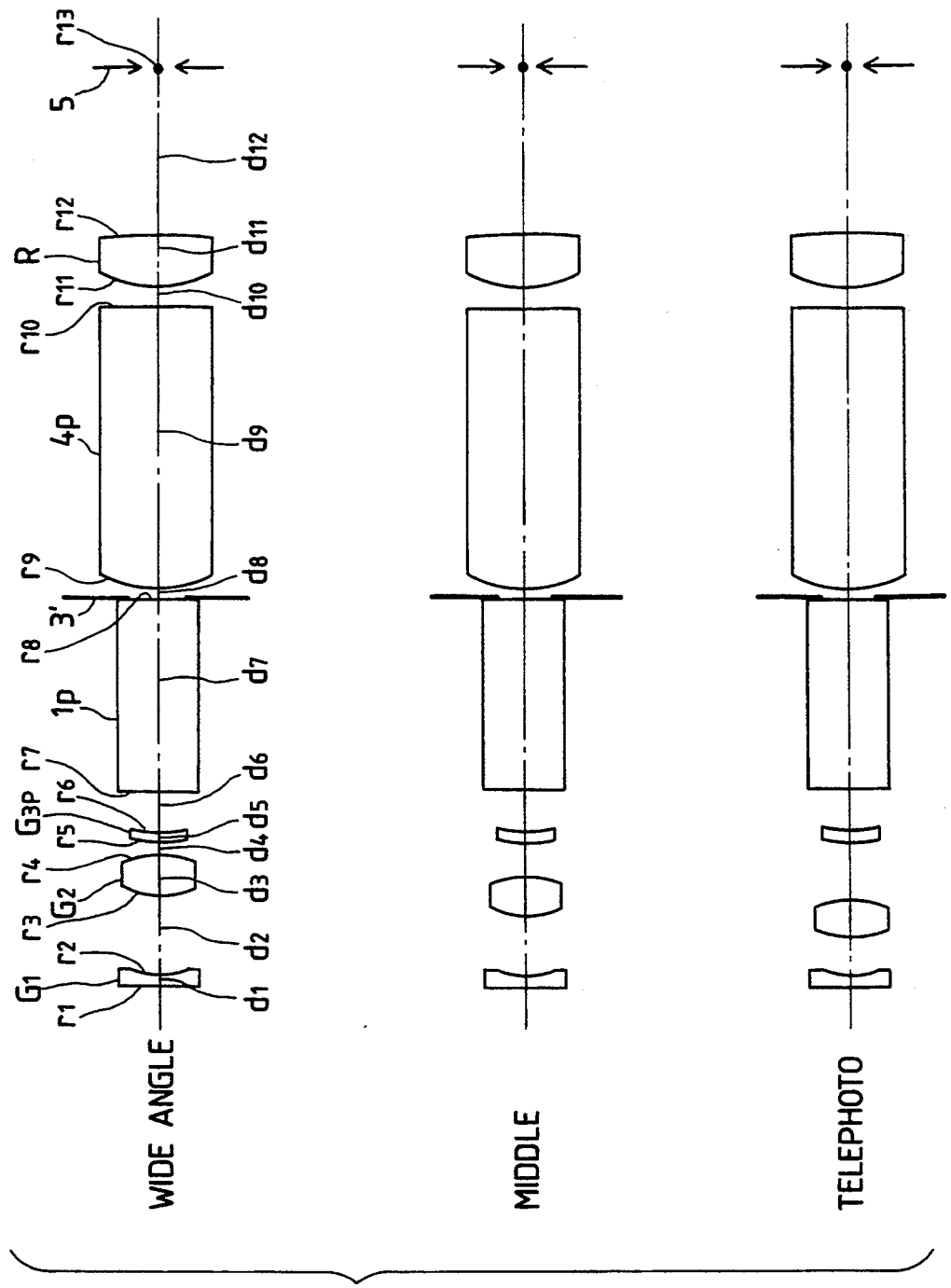
Figure 17:
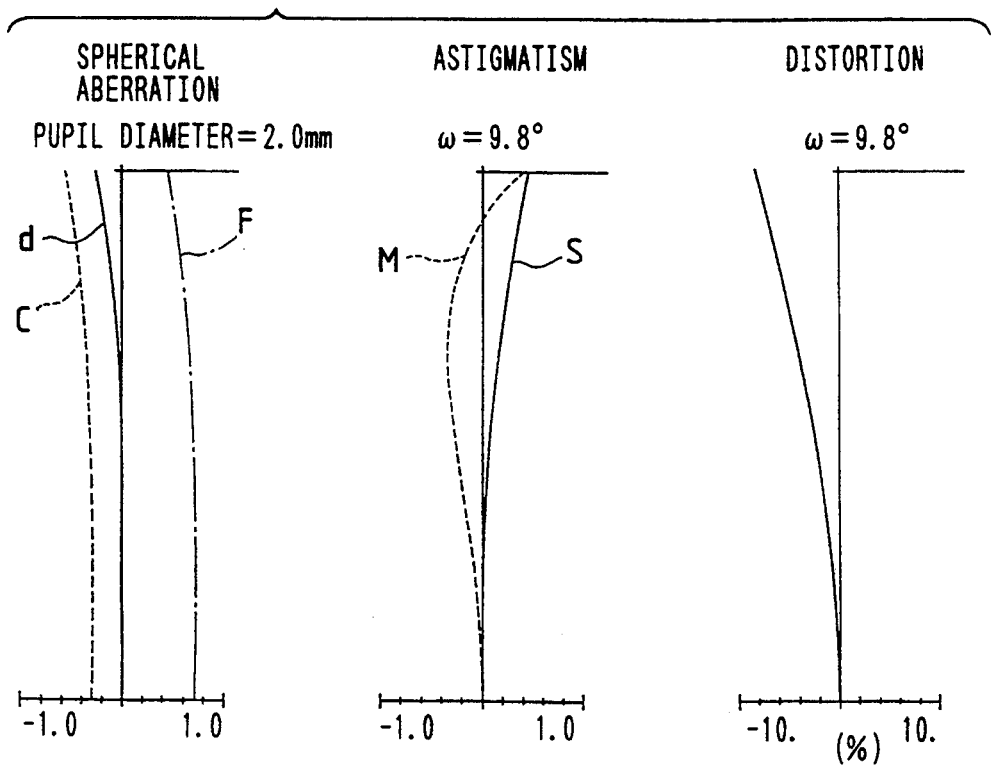
FIGS. 17 to 19 are aberration curve diagrams relative to wide angle, middle, and telephoto positions in ordinary photography of the second embodiment.
Figure 18:
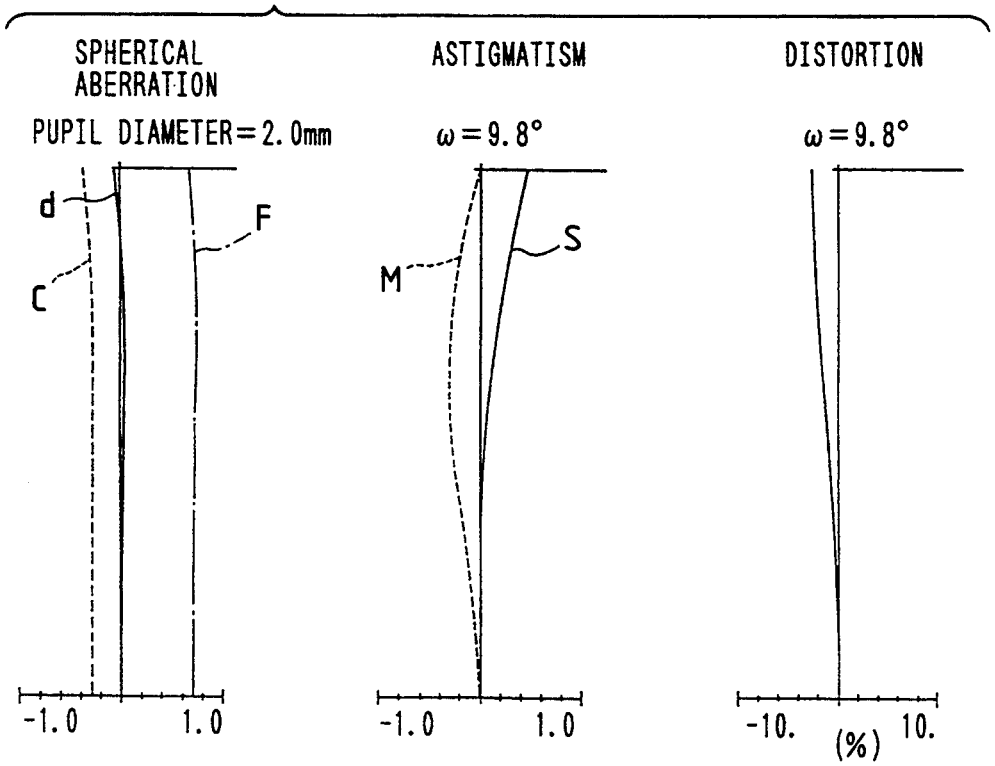
Figure 19:
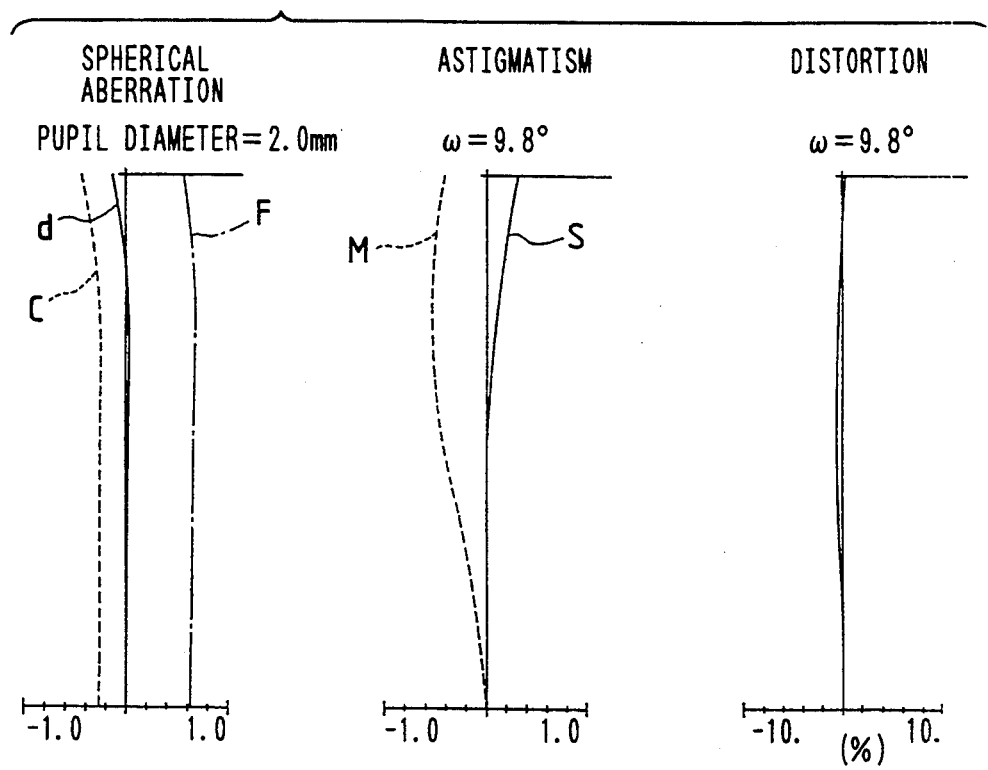
Figure 20:
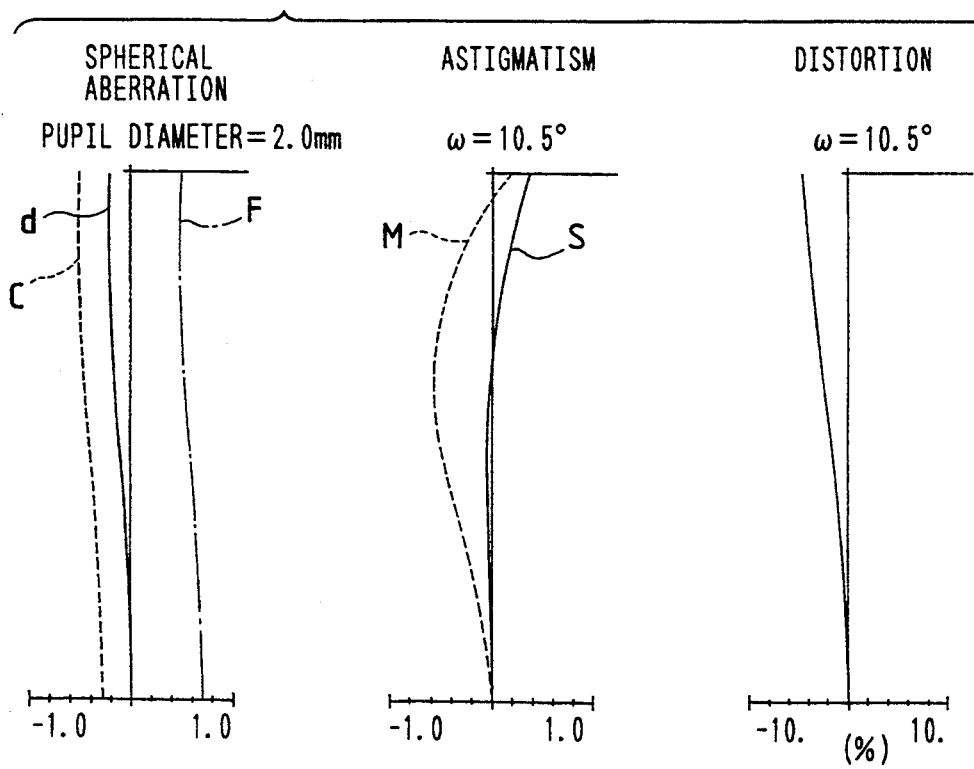
FIGS. 20 to 22 are aberration curve diagrams relative to wide angle, middle, and telephoto positions in panoramic photography of the second embodiment.
Figure 21:
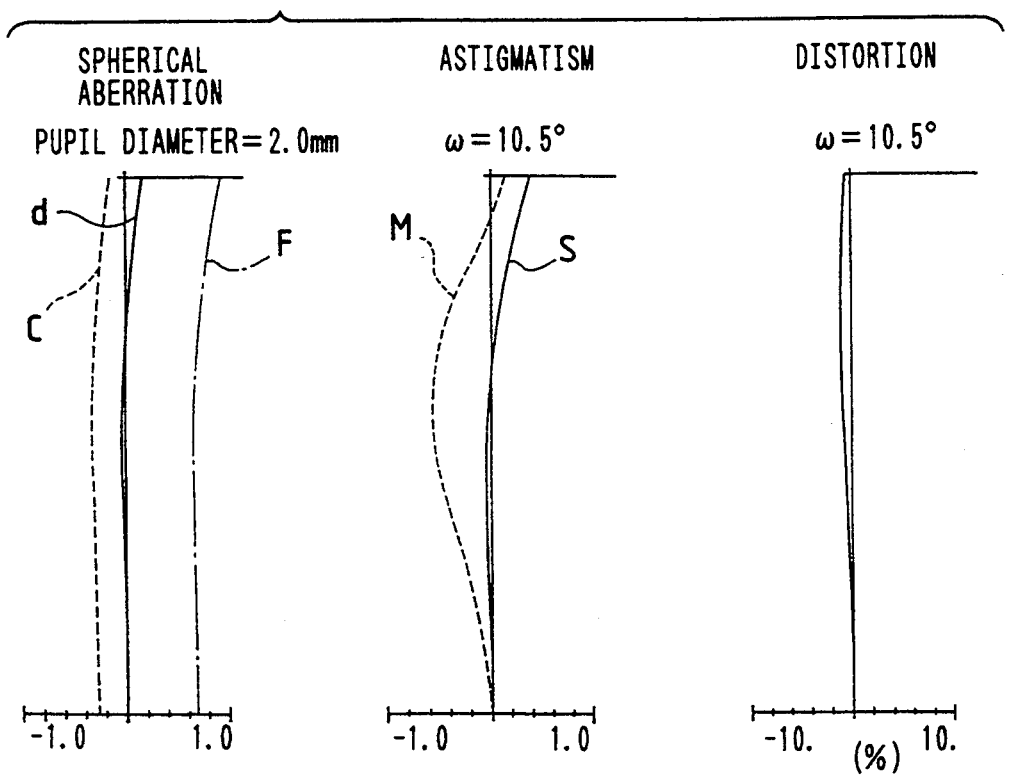
Figure 22:
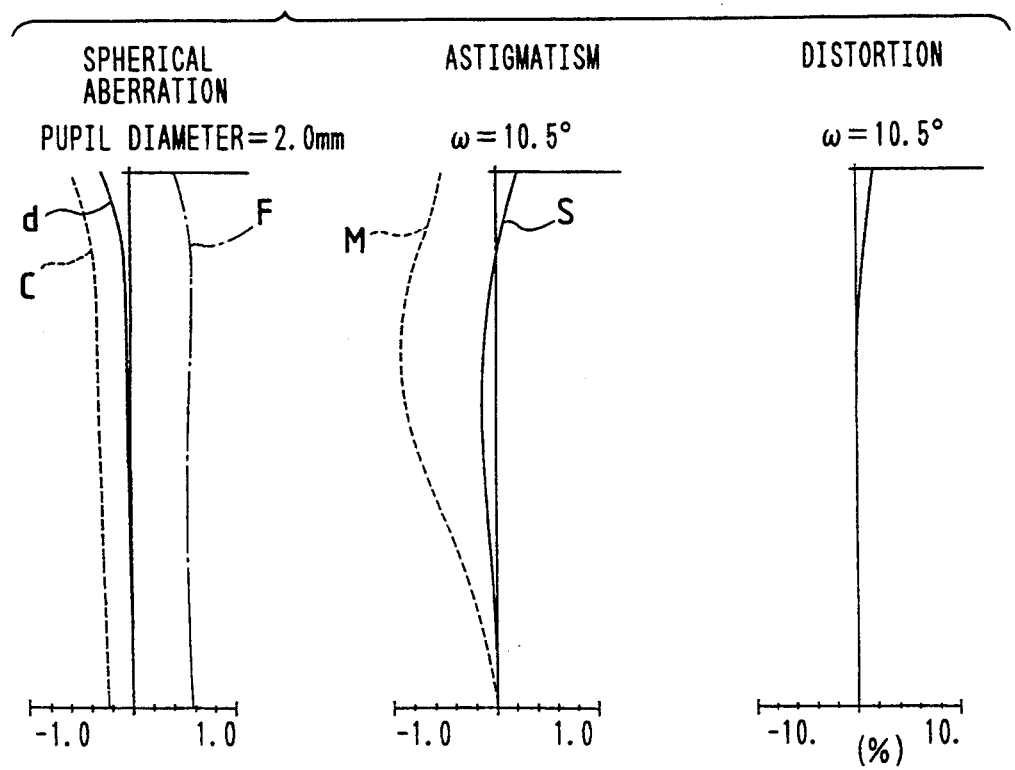

This embodiment, as shown in FIGS. 15 and 16, is constructed so that the fixed lens unit $G_{3N}$ is composed of a single positive lens and the fixed lens unit $G_{3P}$ is of a single negative lens, and the function of the entire variable magnification finder optical system is the same as in the first embodiment. The numerical data of the variable magnification finder optical system in the second embodiment are shown below. Also, the aberration curve diagrams are given In FIGS. 17 to 22.

| (Ordinary photography) | |
|---|---|
| Magnification | 0.38 ~ 0.50 ~ 0.66 |
| Field angle of incidence (2ω) | 52.8 ~ 39.4 ~ 29.6 |

-continued

| Field angle of emergence (2ω) | 19.6 ~ 19.6 ~ 19.6 | | |
|---|---|---|---|

$r_1 = -50.741$
$\quad d_1 = 1.0 \quad n_1 = 1.584 \quad \nu_1 = 30.5$
$r_2 = 6.756$ (aspherical)
$\quad d_2 = D_1$ (variable)
$r_3 = 8.057$ (aspherical)
$\quad d_3 = 3.99 \quad n_2 = 1.492 \quad \nu_2 = 57.7$
$r_4 = -8.002$
$\quad d_4 = D_2$ (variable)
$r_5 = -7.061$ (aspherical)
$\quad d_5 = 3.2 \quad n_3 = 1.492 \quad \nu_3 = 57.7$
$r_6 = -7.890$
$\quad d_6 = D_3$ (variable)
$r_7 = \infty$
$\quad d_7 = 17.55 \quad n_4 = 1.492 \quad \nu_4 = 57.7$
$r_8 = \infty$
$\quad d_8 = 1.0$ (field frame position)
$r_9 = 10.873$
$\quad d_9 = 28.09 \quad n_5 = 1.492 \quad \nu_5 = 57.7$
$r_{10} = \infty$
$\quad d_{10} = 2.0$
$r_{11} = 11.281$ (aspherical)
$\quad d_{11} = 5.0 \quad n_6 = 1.492 \quad \nu_6 = 57.7$
$r_{12} = -314.523$
$\quad d_{12} = 16.5$
$r_{13} = $ (eyepoint)

Aspherical coefficients

Second surface ($r_2$)
$E = -0.17052 \times 10^{-3}, \quad F = 0.45701 \times 10^{-4},$
$G = -0.33507 \times 10^{-5}$ Third surface ($r_3$)
$E = -0.72331 \times 10^{-3}, \quad F = 0.44191 \times 10^{-5},$
$G = -0.99811 \times 10^{-6}$ Fifth surface ($r_5$)
$E = -0.21615 \times 10^{-3}, \quad F = -0.17438 \times 10^{-3},$
$G = 0.19939 \times 10^{-4}$ Eleventh surface ($r_{11}$)
$E = -0.16331 \times 10^{-3}, \quad F = 0.21280 \times 10^{-5},$
$G = -0.44546 \times 10^{-7}$ Zoom data

| | Wide angle position | Middle position | Telephoto position |
|---|---|---|---|
| $D_1$ | 9.889 | 6.845 | 4.509 |
| $D_2$ | 1.925 | 3.901 | 6.540 |
| $D_3$ | 1.000 | 1.000 | 1.000 |

(Panoramic photography)

| Magnification | 0.46 ~ 0.60 ~ 0.79 |
|---|---|
| Field angle of incidence (2ω) | 46.4 ~ 34.8 ~ 26.2 |
| Field angle of emergence (2ω) | 21.0 ~ 21.0 ~ 21.0 |

$r_1 = -50.741$
$\quad d_1 = 1.0 \quad n_1 = 1.584 \quad \nu_1 = 30.5$
$r_2 = 6.756$ (aspherical)
$\quad d_2 = D_1$ (variable)
$r_3 = 8.057$ (aspherical)
$\quad d_3 = 3.99 \quad n_2 = 1.492 \quad \nu_2 = 57.7$
$r_4 = -8.002$
$\quad d_4 = D_2$ (variable)
$r_5 = 22.056$ (aspherical)
$\quad d_5 = 1.0 \quad n_3 = 1.584 \quad \nu_3 = 30.5$
$r_6 = 11.569$
$\quad d_6 = D_3$ (variable)
$r_7 = \infty$
$\quad d_7 = 17.55 \quad n_4 = 1.492 \quad \nu_4 = 57.7$
$r_8 = \infty$
$\quad d_8 = 1.0$ (field frame position)
$r_9 = 10.873$
$\quad d_9 = 28.09 \quad n_5 = 1.492 \quad \nu_5 = 57.7$
$r_{10} = \infty$
$\quad d_{10} = 2.0$
$r_{11} = 11.281$ (aspherical)
$\quad d_{11} = 5.0 \quad n_6 = 1.492 \quad \nu_6 = 57.7$
$r_{12} = -314.523$
$\quad d_{12} = 16.5$
$r_{13} = $ (eyepoint)

Aspherical coefficients

Second surface ($r_2$)
$E = -0.17052 \times 10^{-3}, \quad F = 0.45701 \times 10^{-4},$
$G = -0.33507 \times 10^{-5}$ Third surface ($r_3$)
$E = -0.72331 \times 10^{-3}, \quad F = -0.44191 \times 10^{-5},$
$G = -0.99811 \times 10^{-6}$ Fifth surface ($r_5$)
$E = -0.50770 \times 10^{-3}, \quad F = 0.12720 \times 10^{-4},$
$G = -0.99280 \times 10^{-6}$ Eleventh surface ($r_{11}$)
$E = -0.16331 \times 10^{-3}, \quad F = 0.21280 \times 10^{-5},$
$G = -0.44546 \times 10^{-7}$ Zoom data

| | Wide angle position | Middle position | Telephoto position |
|---|---|---|---|
| $D_1$ | 9.889 | 6.845 | 4.509 |
| $D_2$ | 1.156 | 3.132 | 5.771 |
| $D_3$ | 3.966 | 3.966 | 3.966 |

The value of Eq. (2) is 0.84.

In the numerical data of each embodiment, $r_1, r_2 \ldots$ represent radii of curvature of individual lens surfaces; $d_1, d_2 \ldots$ thicknesses of individual lenses or airspaces therebetween; $n_1, n_2 \ldots$ refractive indices of individual lenses; $\nu_1, \nu_2 \ldots$ Abbe's numbers of individual lenses; and $D_1, D_2,$ and $D_3$ variable airspaces.

What is claimed is:

1. A variable magnification finder optical system constructed independent of a photographic optical system, comprising:
    an objective optical system including at least one variable magnification lens unit and a first fixed lens unit, and having a positive refracting power as a whole, for forming an intermediate image of an object;
    a field frame disposed adjacent to the intermediate image formed by said objective optical system, said field frame having a size defining a first range of observation of said variable magnification finder optical system;
    an eyepiece optical system having a positive refracting power, for observing said intermediate image;
    a second fixed lens unit having a different focal length from a focal length of said first fixed lens unit and disposed in parallel with said first fixed lens unit;
    wherein said variable magnification lens unit moves along an optical axis for a variation of field angle of said variable magnification finder optical system, and for zooming said objective optical system from a wide angle position to a telephoto position, in accordance with a variation of field angle of said photographic optical system; and
    means for alternating said first fixed lens unit and said second fixed lens unit in an optical path of said objective optical system to form a structure of making a change in magnification of said variable magnification finder optical system other than said zooming in accordance with a change in size of an image plane of said photographic optical system, and held stationary during said zoom.

2. A variable magnification finder optical system according to claim 1, further comprising a sub-field-frame having a size defining a second range of observation of said variable magnification finder optical system, said second range of observation being different than said first range of observation, and said sub-field-frame being arranged in parallel with said field frame, said sub-field-frame replacing said field frame whenever said second fixed lens unit is inserted in said optical path of said objective optical system.

3. A variable magnification finder optical system according to any one of claims 1, 2 or 6, wherein said variable magnification lens unit is disposed on an object side of whichever one of said first fixed lens unit and said second fixed lens unit is inserted in said optical path of said objective optical system.

4. A variable magnification finder optical system according to claim 2, wherein said first fixed lens unit and said second fixed lens unit are adapted for ordinary photography and for panoramic photography, respectively, and satisfy a condition $$f_{3N} > f_{3P}$$

where $f_{3N}$ is a focal length of said first fixed lens unit and $f_{3P}$ is a focal length of said second fixed lens unit.

5. A variable magnification finder optical system according to any one of claim 2 or 4, wherein said first fixed lens unit and said second fixed lens unit are adapted for ordinary photography and for panoramic photography, respectively, and satisfy a condition $$|(f_{3N}+f_{3P})/(f_{3N}-f_{3P})| < 6.0$$

where $f_{3N}$ is a focal length of said first fixed lens unit and $f_{3P}$ is a focal length of said second fixed lens unit.

6. A variable magnification finder optical system constructed independent of a photographic optical system, comprising:

an objective optical system including at least one variable magnification lens unit and a first fixed lens unit, and having a positive refracting power as a whole, for forming an intermediate image of an object;

a field frame disposed adjacent to the intermediate image formed by said objective optical system, said field frame having a size defining a first range of observation of said variable magnification finder optical system;

an eyepiece optical system having a positive refracting power, for observing said intermediate image; and a second fixed lens unit having a different focal length from a focal length of said first fixed lens unit and disposed outside an optical path of said objective optical system;

wherein said variable magnification lens unit moves along an optical axis for a variation of field angle of said variable magnification finder optical system, and for zooming said objective optical system from a wide angle position to a telephoto position, in accordance with a variation of field angle of said photographic optical system; and means for removing said first fixed lens unit from said optical path of said objective optical system and for inserting said second fixed lens unit in said optical path of said objective optical system instead, when a switch from an ordinary photography mode to a panoramic photography mode, which is different from said zooming is made.

7. A variable magnification finder optical system according to claim 6, further comprising a sub-field-frame having a size defining a second range of observation of said variable magnification finder optical systems, said second range of observation being different than said first range of observation, and said sub-field-frame being arranged in parallel with said field frame, said sub-field-frame replacing said field frame whenever said second fixed lens unit is inserted in said optical path of said objective optical system in place of said first fixed lens unit.

* * * * *